Figure 1:
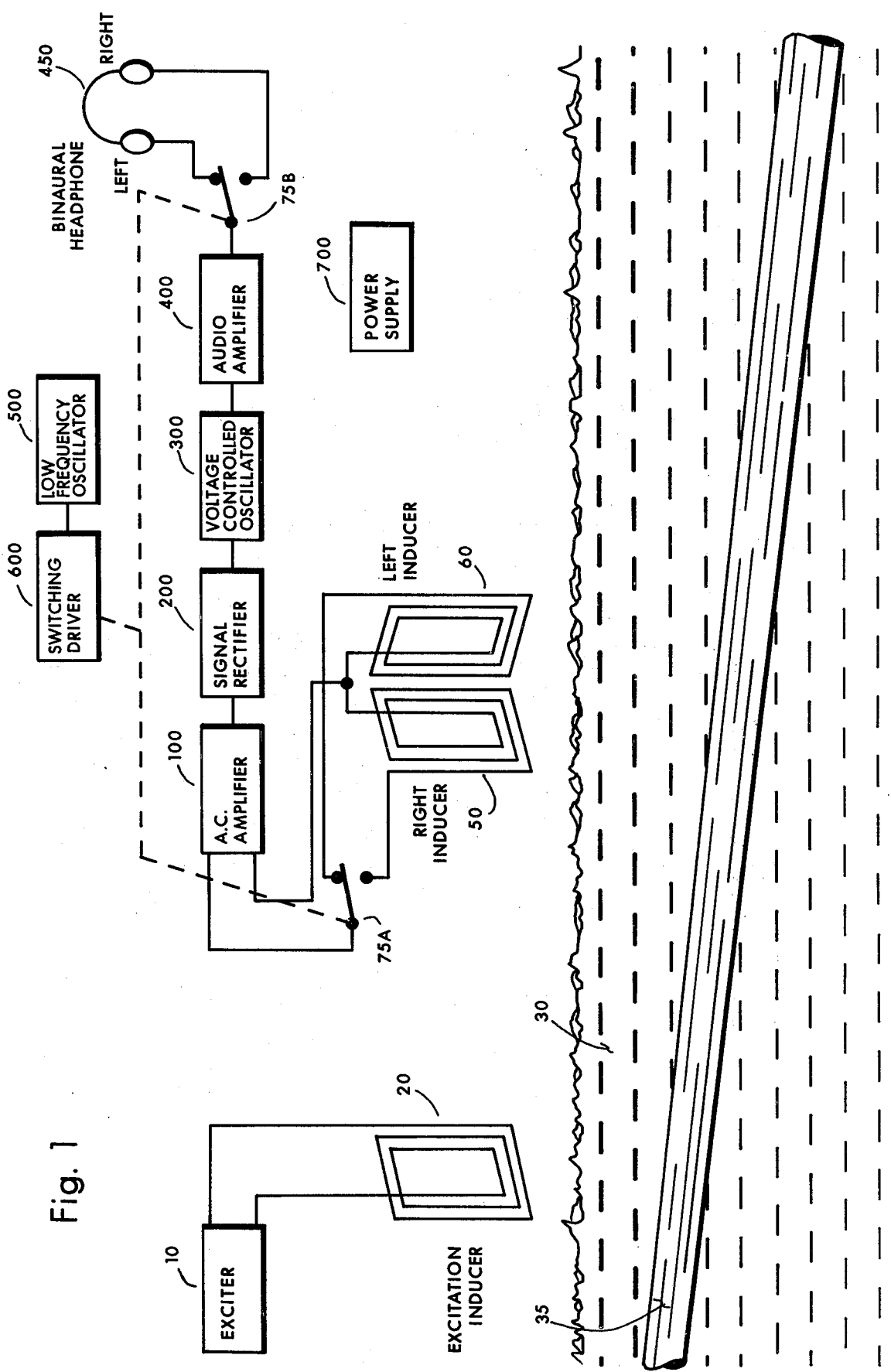

United States Patent [19]

Weber

[11] 4,161,686

[45] Jul. 17, 1979

[54] CONCEALED STRUCTURE TRACING TRANSLATOR APPARATUS INCLUDING POSITION SENSITIVE BITONIC INDICATION MEANS

[76] Inventor: Harold J. Weber, 20 Whitney Dr., Sherborn, Mass. 01770

[21] Appl. No.: 762,028

[22] Filed: Jan. 24, 1977

[51] Int. Cl.² ............................................. G01V 3/00
[52] U.S. Cl. .......................................... 324/3; 324/67
[58] Field of Search ................... 343/112 R; 324/3, 6, 324/67

[56] References Cited

U.S. PATENT DOCUMENTS

| | | | |
|---|---|---|---|
| 3,392,384 | 7/1968 | Wesch | 324/6 |
| 3,893,025 | 7/1975 | Humphreys, Jr. | 324/67 |
| 3,975,735 | 8/1976 | McCullough et al. | 324/3 |
| 4,044,299 | 8/1977 | Weber | 324/3 |

OTHER PUBLICATIONS

Young, C. A., *Measuring the Depth of Buried Cable*, Bell Laboratories Record, Nov. 1965, pp. 399-401.

Primary Examiner—Theodore M. Blum

[57] ABSTRACT

My invention relates to improved method and means for a concealed structure tracing translator apparatus including position sensitive bitonic indication means. The purpose of my new invention is to provide an added dimension to the class of apparatus frequently employed to trace concealed structures exampled by but not limited to that category of device employed for following the lay of buried pipes, wires concealed in architectural constructions, or other like applications for tracing a hidden structure. This added dimension is accomplished in my new invention through the inclusion of the aggregrate combination of receptor and sensory indicator means resulting in bitonic or stereophonic like indication to the operator or user of my new apparatus. The resultant sensory indication is arranged to provide the operator with relative right or left hand perceptibility as to the lay of the said concealed structure.

12 Claims, 6 Drawing Figures

CONCEALED STRUCTURE TRACING TRANSLATOR APPARATUS INCLUDING POSITION SENSITIVE BITONIC INDICATION MEANS

SUMMARY

My new invention relates to improved method and means together with the description of a combination of apparatus which can provide improved acuity in the tracing of concealed structures. My invention is novel over prior art in the ability to provide, in one practiced embodiment, a left or right hand sense of relative tracing error to the operator. The indication for this error sense in my invention is shown by me to be translated to the operator as a biphonic, or stereophonic like sensory indication. The operator will, when properly aligned with the hidden structure, receive a nearly identical tone from each headphone in a binaural headset and furthermore the absolute pitch of which is proportional to the relative electromagnetic field strength intercepted by my new translator. This said electromagnetic field is caused to emanate from the said hidden structure by a substantially single frequency continuous wave exciter means separate from my new apparatus, said exciter means being suitably coupled to the said hidden structure.

When my new apparatus is moved somewhat to the right of the operator, the operator will receive a biphonic indication in his headset with the pitch of the tone in one earphone decreasing, while the pitch of the other increases. In the particular form of apparatus I have modeled and described in my specification to example my new invention, the tone emanating from the operators right earphone would descend in pitch, while the tone from the left earphone would increase in pitch.

When my new apparatus is moved somewhat to the left of the hidden structure and the operator, inverse sensory indication will be provided the operator to that described in the preceding paragraph for the said right hand positional error. For my modeled device this means the tone emanating from the operators left earphone would descend in pitch, while the tone from the right earphone would increase in pitch.

My new invention improves upon prior art in the preliminary locating of a structure of extended and uncertain lay. The pitch of the tone emanating from the binaural headset will change in pitch as the concealed structure is approached. By this means the operator will be informed that he is nearing the concealed structure during initial spotting, whereupon actual tracing may take place.

REFERENCE TO DRAWINGS

Figure 2:
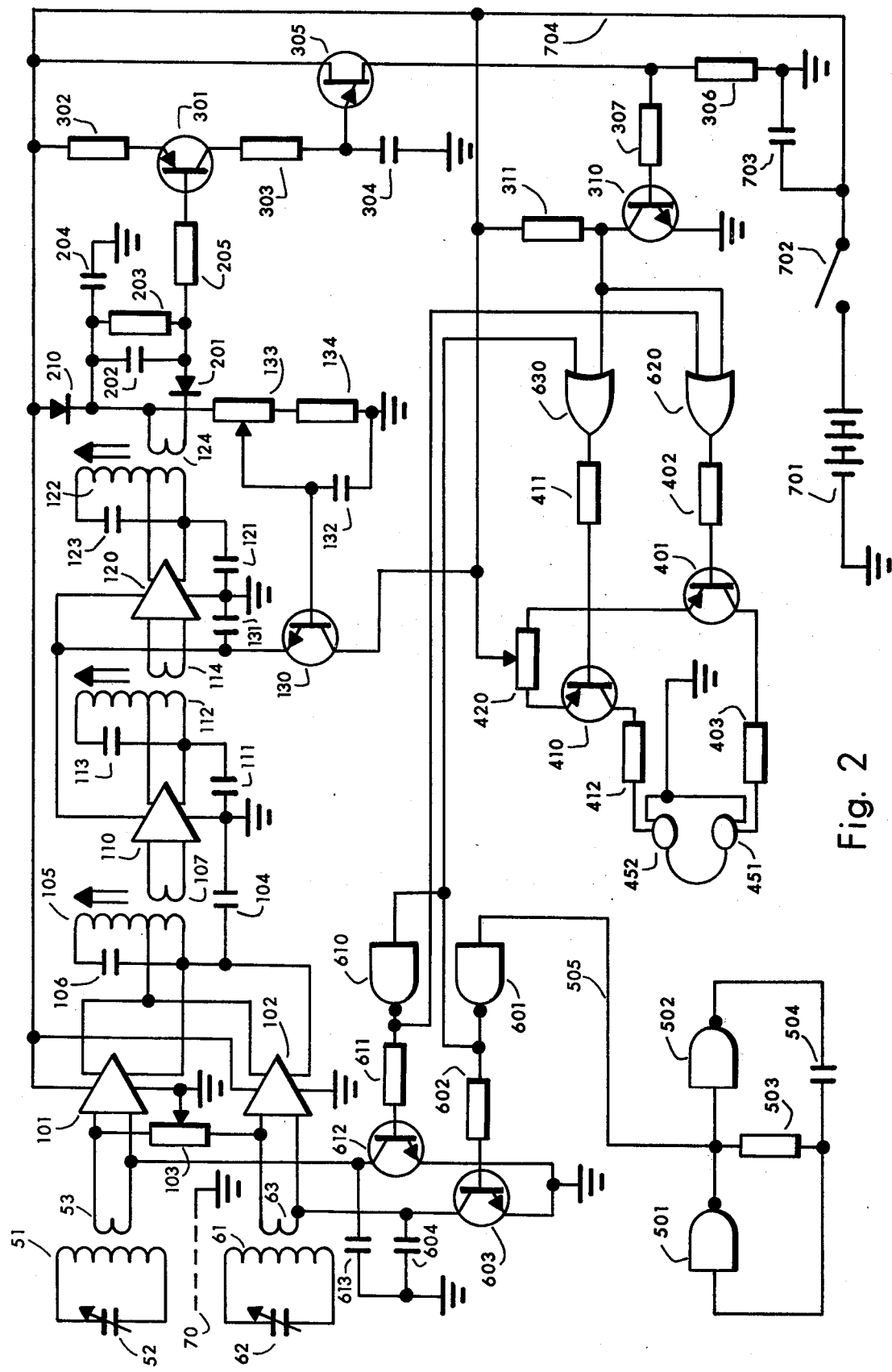
Figures 3A, 3B, 3C:
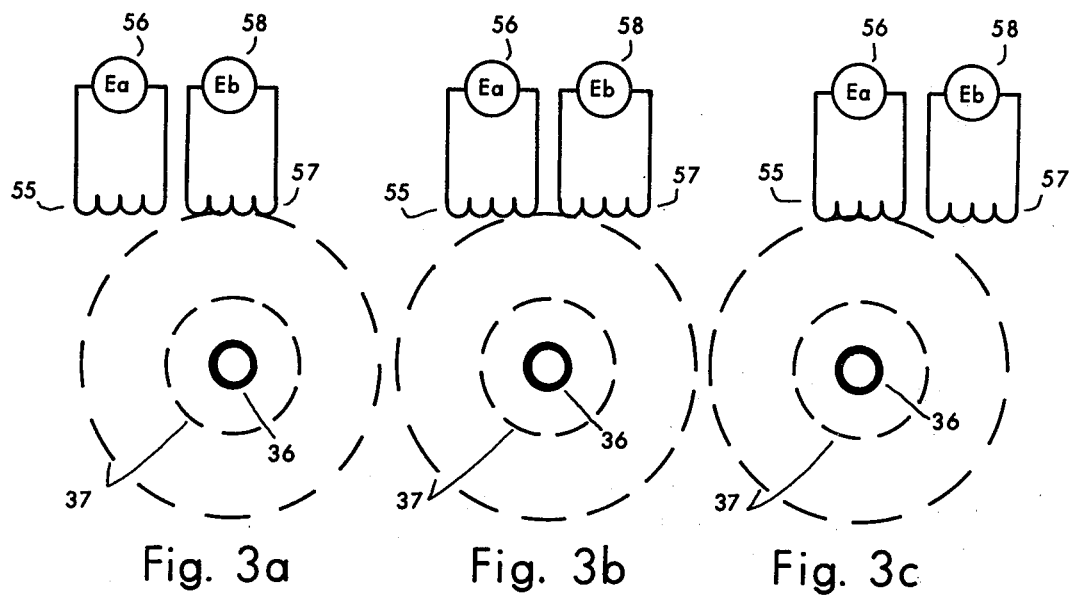

My disclosure includes three sheets of drawings containing four figures as:

FIG. 1—Functional block diagram for translator means,

FIG. 2—Schematic for a preferred embodiment of my translator,

FIG. 3a—Field patterns with inducer means displaced to left,

FIG. 3b—Field patterns with inducer means centered about field lines,

FIG. 3c—Field patterns with inducer means displaced to right, and

Figure 4:
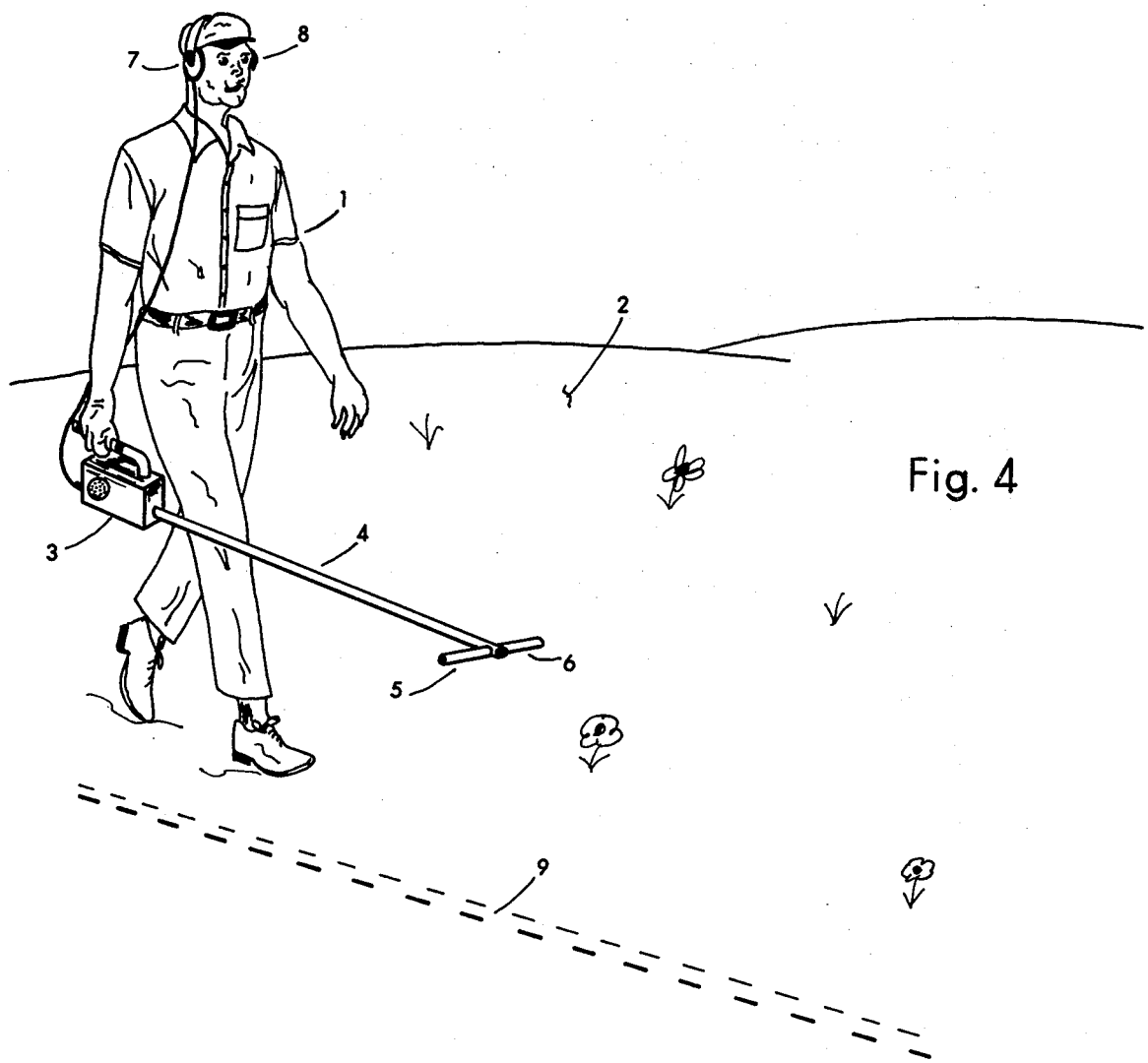

FIG. 4—Practical form for translator as concealed structure tracing apparatus shown being used for surveying a buriment such as a pipe or cable.

FIG. 1 is a block diagram showing my new invention. The purpose is to provide a means with improved acuity for locating and tracing a more conductive concealed structure 35 in a less conductive covert medium 30, said structure having been caused to emanate a first frequency alternating current electromagnetic field by a separate efficacious EXCITER means 10 and EXCITATION INDUCER 20.

My new invention includes a RIGHT INDUCER 50 and a LEFT INDUCER 60, operative as electromagnetic field receptors, so arranged as to intercept the first frequency electromagnetic field lines from the concealed structure at two slightly offset positions. The field receptors are each operative to produce a second frequency minute alternating current voltage proportional to the respective first frequency electromagnetic induction field they intercept from the concealed structure. The resulting said minute voltages are caused to be alternatively switched by means 75A to cause either the minute voltage from right inducer 50 or from left inducer 60 to diplex into the input of A.C. AMPLIFIER 100 wherein the magnitude of the said minute alternating current voltage from the inducers is increased in magnitude. The output of the A.C. amplifier is coupled to a SIGNAL RECTIFIER 200 operative to rectify or detect the incoming A.C. signal. The resultant D.C. signal, the instantaneous amplitude of which is proportional to the incoming A.C. signal strength, is coupled to a VOLTAGE CONTROLLED OSCILLATOR means 300 which is operative to produce a third frequency, tone or signal which varies in proportion to the coupled D.C. signal. The voltage controlled oscillator is coupled through a third frequency, say AUDIO AMPLIFIER means 400 to a means 75B which alternatively switches the audio amplifier output between the left and right hand headphone comprising the BINAURAL HEADPHONE or binaural transducer 450. The alternate switching of the binaural input switch 75A and the binaural output switch 75B is in synchronization such that when the left inducer 60 is inputed the left earphone is operative and conversely when the right inducer 50 is inputed the right earphone is operative. This alternate switching action is controlled by switching driver 600 and fourth frequency oscillator 500. A power supply means 700 provides operational power for all the requisite stages.

The result of the particular combination of my new invention as shown in FIG. 1 is a method whereby the bitonic output from either the left or right hand earphone will be proportional in pitch or tone to the relative signal strength at the respective input transducers. The result is a means which will give a left or right hand perceptability or sense of direction to the operator as to the lay of the said concealed structure. The added dimension for the indication of error sense in my new invention is shown to be translated to the operator as a biphonic, or stereophonic like sensory indication. The translator will, when the input inducers are properly aligned with the concealed structure, output a nearly identical tone from each headphone in the binaural headset 450 and furthermore the absolute pitch of the said tone will be proportional to the relative first frequency electromagnetic field strength intercepted by my new translator. Furthermore when my new apparatus is moved somewhat to the right or left of the operator's position as aligned with the concealed structure, the operator will receive from the output a biphonic indication in his binaural headset 450 with the pitch of the tone in one earphone decreasing, while the pitch in the other headphone increases.

FIG. 2 shows a particular embodiment of my invention which I have modeled, in schematic form. A right inducer 51 and capacitor 52 form a right hand resonant pickup arrangement, or electromagnetic field receptor, operative to produce a second frequency signal which is coupled by winding 53 into second frequency amplifier 101, while left hand inducer 61 and capacitor 62 form a left hand resonant pickup arrangement coupled by winding 63 into amplifier 102. In the particular form I have modeled my inducers and other circuits resonate at an operating first frequency of about 442 kilohertz. Additionally I have shown the inducers 51 and 61 to include a core material of improved permeability such as ferrite or powdered iron so-as to increase the electrical efficiency thereof. In the particular form shown second frequency amplifiers 101 and 102 are alternately switched, or diplexed by respective transistors 612 and 603. In the embodiment I show, when transistor 612 is conducting, or saturated the collector clamps the D.C. level on the input of amplifier 101 to near ground, or in practice at about 0.5 volt. In the case of the particular amplifier chosen for my model, this will cause amplifier 101 to become inoperative. This switch action is alternate, or multiplexed meaning the inducer inputs will alternate. Potentiometer 103 is shown as a means to permit adjustment for gain differences in the two amplifiers 101, 102 by shunting the incoming signal as the arm approaches one end or the other. The output of the amplifiers 101 and 102 are paralleled and connected to winding 105 resonated by capacitor 106, together with bypass capacitor 104. The signal is coupled by winding 107 to amplifier 110, the output of which is connected to winding 112 resonated by capacitor 113, together with bypass capacitor 111. The signal is coupled by winding 114 to amplifier 120, the output of which is connected to winding 122 resonated by capacitor 123, together with bypass capacitor 121. A winding 124 couples the resultant amplified second frequency A.C. signal to signal rectifier 201, detector capacitor 202 and load resistor 203. The resulting negative rectified signal voltage developed by detector 201 is coupled through resistor 205 to the base of transistor 301. The connection of transistor 301 is such that emitter resistor 302 provides degeneration to cause the collector current to be constant and proportional to the voltage applied to the base. A bias diode 210 bypassed by capacitor 204 establishes the operating conditions of transistor 301 to be at the threshold of forward bias even with no incoming signal. The rectified signal then adds to this diode developed bias voltage to cause increased current through transistor 301 proportional to signal strength. The collector of transistor 301 connects to a charge capacitor 304 through resistor 303. Charge or timing capacitor 304 is in the emitter circuit of a class of relaxation oscillator using a unijunction transistor 305. A resistor 306 forms the discharge path for capacitor 304 through unijunction transistor 305. The result is positive pulses at the juncture of resistors 306 and 307 the repetition rate of which is proportional to the charge rate of capacitor 304 as supplied by transistor 301. This forms a third, say audio frequency voltage controlled oscillator which drives the base of amplifier transistor 310 through resistor 307. The resultant negative variable period pulses at the collector of transistor 310 are coupled to logic OR gates 620 and 630.

An astable multivibrator consisting of gain devices 501 and 502 together with resistor 503 and capacitor 504 forms a fourth frequency oscillator with a period of about one hertz. This oscillator developes an output which couples through gain device 601 to the input of logic OR gate 630, switch transistor 603 through resistor 602, and the input of inverter 610. The output of inverter 610 couples to the input of logic OR gate 620 and switch transistor 612 through resistor 611. Capacitors 604 and 613 serve to decouple the higher incoming signal frequency on the collectors of transistors 603 and 612. The complementary logic drive signals arriving at the input of OR logic devices 620 and 630 from gain devices 601 and 610 serves to alternately select the signal path through devices 620 and 630. These respective outputs from devices 620 and 630 couple to transistors 401 and 410 through resistors 402 and 411. A binaural transducer or headset comprising left earphone 452 and right earphone 451 is coupled through resistors 412 and 403 to transistors 410 and 401 respectively. A potentiometer 420 is shown as a means to allow for balancing the audio level from either headphone. This enables the compensation for hearing differences between an individual operator's ears.

The gain of the second frequency A.C. amplifier is reduced by lowering the supply voltage in my model. This is accomplished by emitter follower 130 which supplies a voltage from potentiometer 133 which varies from a low value to a value near the battery level. The purpose is to enable the operator to set the gain of the second frequency amplifier to a level suitable for operating the translator under a variety of different incoming first frequency signal level conditions.

FIG. 3a shows a representation of the first frequency electromagnetic field lines 37 as they emanate from a concealed structure such as a pipe 36. The left inducer 55 and right inducer 57 are shown asymmetrically displaced to the left, which shows the right inducer 57 will encounter more field lines resulting in a greater output $E_b$ at termination 58 than will be induced into left inducer 55 at termination 56.

FIG. 3b shows a similar representation to FIG. 3a with the left inducer 55 and right inducer 57 aligned over the concealed structure 36. The two inducers encounter the same field lines resulting in equal outputs from the inducers at both terminations 56 and 58.

FIG. 3c shows a similar representation to FIG. 3a with the left inducer 55 and right inducer 57 shown asymmetrically displaced to the right, which shows the left inducer 55 will encounter more field lines resulting in a greater output $E_b$ at termination 56 than will be induced into 57 at termination 58.

FIG. 4 shows a particular form my new invention has been shown to take as a portable pipe or cable locator. An operator 1 is shown traversing a covert terrain 2 carrying my new apparatus 3 at one end of a short staff 4, the other end of which supports the electromagnetic field receptor means as the right inducer 5 and left inducer 6 on either side of the staff. The figure shows the operator following a concealed structure 9 such as a pipe, while the operator listens on his right earphone 7 and left earphone 8 for deviations.

My new invention has particular application as the translator means for tracing or surveying hidden structures such as pipe, cables and the like. As such my new invention has been described in a particular form which I have modeled and found particularly suitable for such application. This description should not be construed as limiting the scope of application for my new invention nor limit the form it may take.

While my invention is shown to use two electromagnetic field receptors, say inducers, on a common axis, this shall not prevent the scope of my new invention from including any plurality of inducers on any number of axis be they at differing angles or not so long as the intent of my invention is met, that being to receive the first frequency field lines in such a way as to sense position thereof.

While my new invention has been shown to use particular types of integrated circuit function and gain devices, a person skilled in the art could duplicate the same function from built up circuits consisting of individual components arranged in a wide variety of combinations, or with other combinations of integrated circuit gain devices.

While my second frequency A.C. amplifier is shown to employ a straight amplifier, or more specifically a class of amplifier commonly referred to as a tuned radio frequency amplifier, this shall not serve to restrict my new invention to this kind of said amplifier but shall include superhetrodyne or regenerative amplifying means, or any method known to those skilled in the art suited for the purpose of the said A.C. amplifier means.

Although I show an exampled operating first frequency of 442 kilohertz, this shall not be construed as limiting my new apparatus from operation at any other frequency as may be suitable in the electromagnetic spectrum.

The elements comprising my said translator when properly coupled to each other as in FIG. 2 forms a compact package which can principally be contained upon a printed circuit board or like support means within a protective housing. My model which operates successfully and is herein described utilizes the following key components and component values.

integrated circuit 101,102,110,120—703C
integrated circuit 501,502,601,610—¼CD4011
integrated circuit 620,630—¼CD4071
transistor 130,310,603,612—2N-4123
transistor 301,401,410—2N-4125
transistor 305—2N-4871
diode 201—1N34
diode 210—1N914
transformer 105,112,122—Interstage coupling transformer 442 KHz
inducer 51, 61—left and right pickup loop resonates with 52 and 62 at 442 KHz
capacitor 104,111,121,131,132,204—100 nanofarad
capacitor 604,613—20 nanofarad
capacitor 202—5 nanofarad
capacitor 504—470 nanofarad
capacitor 304—50 nanofarad
capacitor 703—200 nanofarad
potentiometer 103—50 kilohm
potentiometer 133—5 kilohm
potentiometer 420—100 ohm
resistor 134—820 ohm
resistor 203—10 kilohm
resistor 302—1,800 ohm
resistor 303—6,800 ohm
resistor 205—39 kilohm
resistor 306—150 ohm
resistor 307,402,411,602,611—1,000 ohm
resistor 311—4,700 ohm
resistor 403,412—27 ohm
resistor 503—330 kilohm
transducer 451, 452—binaural, stereophonic headset about 16 ohm impedance
battery 701—electrochemical battery power souce, 12 volts
disconnect 702—S.P.S.T. switch means The foregoing parameters and values are given by way of example only to assist a person of average skill to duplicate a model of my invention for experimental purposes and are not intended to limit in any way the scope of my invention.

My invention is shown as a buried cable or pipe locating apparatus. This example shall not limit the scope of my invention, but shall also include applications for tracing structural members as for example reinforcement rods in concrete, wires in walls, underwater concealments traced from a shipboard receptor, or concealments such as a pipeline traced by trailing my apparatus from a flying machine, and other such like applications as will occur to those skilled in the art.

What I claim for my new invention is:

1. Translator means for providing improved directional acuity and at least the sense of relative, say right or left hand, positional perceptability as to the lay of concealed conductive structurement through the use of a plurality of separate acting inducer means operative to provide plural sensory indication to an operator, said translator including in operative combination:

a. Plural inducer means for the interception of various magnitudes of first frequency electromagnetic field lines, said field lines having been produced sympathetically in the concealed structurement by separate exciter means, said plural inducer means including at least two separate acting electromagnetic field receptor means arranged in corresponsive offset positions therefrom operative to provide second frequency minute alternating current signals the individual levels of which are uniquely proportional to the relative signal strength of said first frequency electromagnetic field lines accordingly intercepted at each of the said receptor means said offset positions;

b. A.C. amplifier means, coupled to said inducer means, operative to increase the magnitude of said second frequency said minute alternating current signal levels produced by each of the said plural electromagnetic field receptor means and thereby produce effectively separate second frequency signal levels of proportionately greater amplitude at the output of said amplifier means;

c. Signal rectifier means, coupled to said A.C. amplifier means, operative to recover the relative amplitude of the said second frequency said alternating current signal levels as effectively separate direct current control signal voltage levels proportional to each said second frequency alternating current signal level;

d. Voltage controlled oscillator means, coupled to said signal rectifier means, operative to provide source means for variable third frequency signal rates proportional to said direct current control voltage levels;

e. Third frequency amplifier means coupled to said voltage controlled oscillator means;

f. Plural sensory indication means, coupled to said third frequency amplifier means, responsive to said third frequency thereby being operative to provide at least, say left and right hand, bi-positional sensory indication;

g. Plural control means, including a source of fourth signal, wherein said control means is:

ga. coupled to said inducer means and said A.C. amplifier means, operative to act with said fourth frequency signal so as to provide at least a distinctly separate, say left and right hand, second frequency response amplification, albeit multiplexed, for each of at least two said second frequency said minute alternating current signal levels; and, gb. coupled to said third frequency amplifier means as coupled to said plural sensory indication means, operative to act with said fourth frequency signal so as to provide at least two distinctly separate, albeit demultiplexed, say left and right hand, third frequency signal outputs therefrom wherein the consequent periodicity of each said signal output third frequency rate is effectuated by a correlative said second frequency signal level; and, h. D.C. power source means for energizing the active elements of the said translator means.

2. Translator means of claim 1 wherein said plural inducer means is a plural electromagnetic field induction loop means responsive to said first frequency containing a core material of improved permeability.

3. Translator means of claim 1 wherein said plural electromagnetic field receptor means second frequency signal output is caused to be switched in an alternative manner into a common A.C. amplifier means as a multiplexed signal.

4. Translator means of claim 1 wherein said A.C. amplifier means is caused to be selectively resonant principally at the said second frequency for purpose of effecting improved noise immunity thereby resulting in greater translator operating range.

5. Translator means of claim 1 wherein said third frequency signal source said voltage controlled oscillator means includes a relaxation oscillator circuit with the timing capacitor driven by a modulated constant current source.

6. Translator means of claim 1 wherein said plural sensory indication means is a binaural headset including at least a separate earphone for each the right ear and the left ear.

7. Translator means of claim 1 wherein said plural control means is employed to multiplex said electromagnetic field receptor said minute alternating current said second frequency signal levels through common A.C. amplifier means.

8. Translator means of claim 6 wherein said third frequency amplifier means includes potentiometric means for balancing third frequency level produced by either earphone to compensate for hearing, say ear response, differences between individual operators.

9. Translator means of claim 1 wherein said D.C. power source includes a combination of electrochemical cell apparatus, say battery means, operative to produce a united electric effect.

10. The translator of claim 1 wherein the said translator means is made as a handheld, operator carried form particularly suited for the class of apparatus used for tracing buried or otherwise hidden structures wherein said plural inducer means is affixed to one end of a short staff, wherein further said translator circuit means is operatively provided in a containment means affixed for the most part to the opposite end of the said short staff.

11. Translator means of claim 1 wherein said plural control means is employed to multiplex said third frequency signal coupled from common said second frequency amplifier means and common said third frequency source means to any of several said plural sensory indication means.

12. Translator means of claim 1 wherein is included a source of fourth frequency signal coupled to said plural control means operative to provide a gating signal for purpose of multiplexing, in a sequential manner, any one of at least two said electromagnetic field receptor means said minute alternating current said second frequency signal levels into said A.C. amplifier means input, as well as for purpose of de-multiplexing the resulting combined third frequency signal into at least two separate third frequency signals each of which drives a separate sensory indication means.

* * * * *